J. H. Treadwell,
Cake Cutter,

N° 65,618.      Patented June 11, 1867.

Witnesses:
Geo. H. Andrews
Samuel N. Piper

Inventor:
John H Treadwell.
by his attorney.

United States Patent Office.

JOHN H. TREADWELL, OF SWAMPSCOTT, MASSACHUSETTS.

Letters Patent No. 65,618, dated June 11, 1867.

IMPROVED TART-CUTTER.

*The Schedule referred to in these Letters Patent and making part of the same.*

TO ALL PERSONS TO WHOM THESE PRESENTS SHALL COME:

Be it known that I, JOHN H. TREADWELL, of Swampscott, in the county of Essex, and State of Massachusetts, have invented a new and useful Tart-Cutter; and do hereby declare the same to be fully described in the following specification, and represented in the accompanying drawings, of which—

Figure 3:
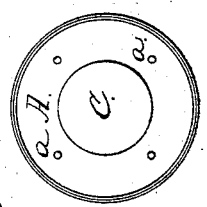
Figure 4:
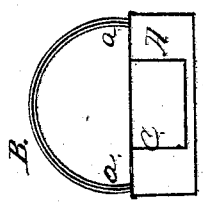
Figure 1:
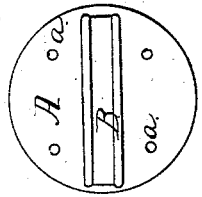
Figure 2:
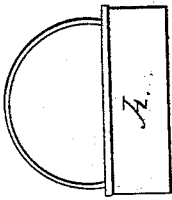

Figure 1 is a top view.
Figure 2, a side elevation.
Figure 3, a bottom view; and
Figure 4, a vertical section of it.

Its purpose is to enable a person to cut out and stamp dough in the form and with a cavity necessary to receive a quantity of jelly or other material, which, with the dough when baked, constitutes what is usually termed a jelly tart.

In the drawings, A is a circular or other proper-shaped box or cutter, open at bottom and closed at top, except in having one or more holes $a$ made through such top. A handle, B, may be applied to and so as to extend above the top in manner as represented. These holes $a$ are to allow the air in the box to escape when the box is stamping a piece of dough. The holes also admit air into the box while it may be in the act of being withdrawn from a sheet of dough. Within the box A, and concentric therewith, is a die or cylinder, C, which is attached to the top plate of the box, and has its bottom arranged at a distance from the said plate somewhat less than the lower edge of the box from the said plate. When the article so made is stamped down upon a sheet of dough, it will separate therefrom a circular piece formed with a cavity or chamber in its middle, such cavity being for holding a quantity of jelly.

The common way of forming the paste for holding the jelly has been to make it in two layers, one being an annulus and the other a circle of dough, but with my tart-cutter the dough is cut in a circle and stamped with a cavity to receive the jelly or other substance.

I claim the tart-cutter as made with the die C, and the cutter-box A, arranged as specified.

I also claim the combination of the handle B, the cutter-box A, and the die C, arranged as specified, the said box being provided or not with air-holes as described.

JOHN H. TREADWELL.

Witnesses:
R. H. EDDY,
SAMUEL N. PIPER.